2. Sheets. Sheet. 1.

Remus D. Burr's Impt in Gloves.

4278

REISSUED FEB 28 1871

Witnesses.

H. C. Fritz

Thomas G. D. Durand

Remus D. Burr Inventor.

by his Attorneys.

THE NORRIS PETERS CO., WASHINGTON, D. C.

4278 R. D. Burr.

Glove.

Witnesses:

H. J. Stretz

A. H. Cast

Inventor:

R. D. Burr.

Per Munn & Co

Attorneys.

THE NORRIS PETERS CO., WASHINGTON, D. C.

United States Patent Office.

REMUS D. BURR, OF KINGSBOROUGH, NEW YORK.

Letters Patent No. 80,707, dated August 4, 1868; reissue No. 4,278, dated February 28, 1871.

IMPROVEMENT IN GLOVES.

The Schedule referred to in these Letters Patent and making part of the same.

*To all whom it may concern:*

Be it known that I, REMUS D. BURR, of Kingsborough, in the county of Fulton and State of New York, have invented a new and useful Improvement in Gloves; and I do hereby declare the following to be a full, clear, and exact description of the same, reference being had to the accompanying drawing making a part of this specification, in which—

On Sheet I—

Figure 5:
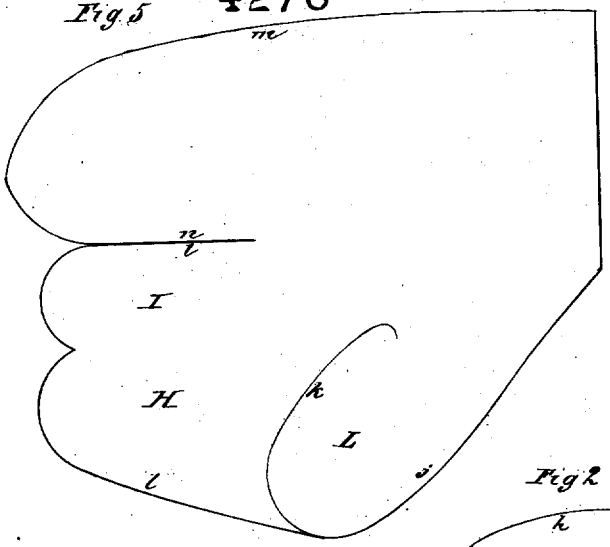
Figure 6:
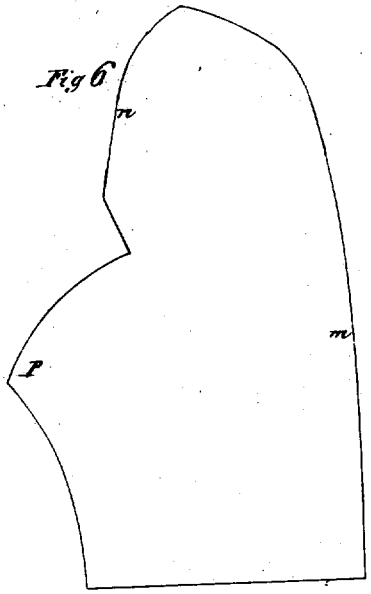

Figures 5 and 6, the front and back of a one-fingered mitten.

On Sheet II—

Figure 7:
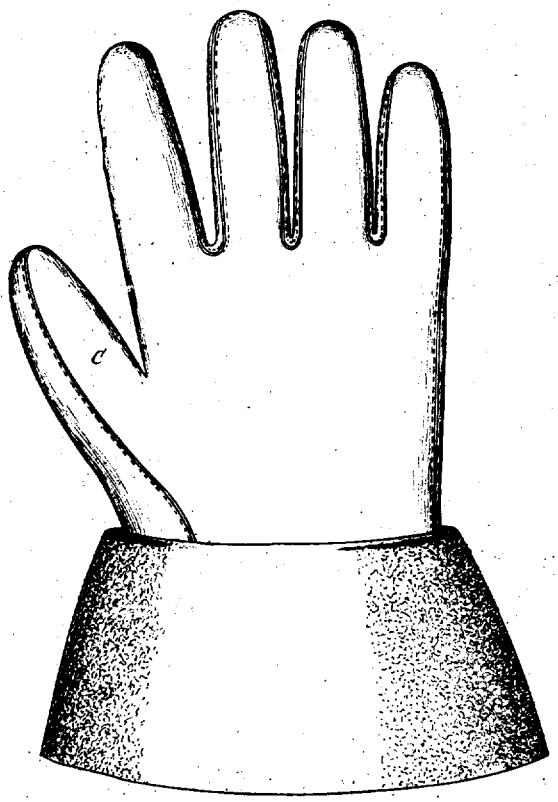
Figure 8:
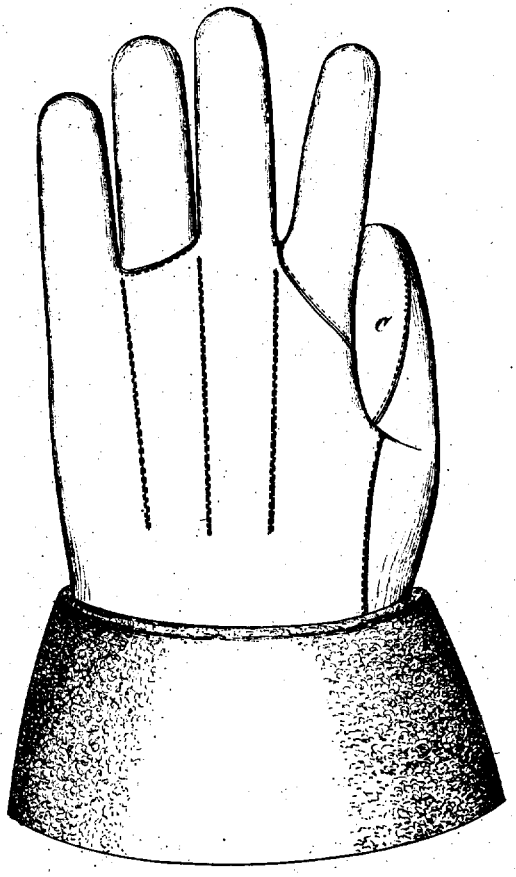

Figures 7 and 8 represent, respectively, front and back views of the completed glove provided with a gauntlet.

This invention relates in part to the separate pieces out of which a glove or mitten is manufactured; and consists—

First, in forming the palm portion or inside of the hand and thumb-piece of a glove or mitten from a single continuous piece of any suitable material, so that, when the glove or mitten is made up, there shall be no seam around the inside of the thumb or palm of the hand.

Second, in cutting the part forming the whole fore-finger in one with the aforesaid continuous palm or inside piece.

Third, in forming the main back piece with a gore-shaped projection, to form the junction between the base of the fore-finger and thumb, without the aid of small gores.

Fourth, as a new article of manufacture, the glove composed of the several parts herein described, shaped, and united, as specified.

Referring to the drawing—

Figure 1:
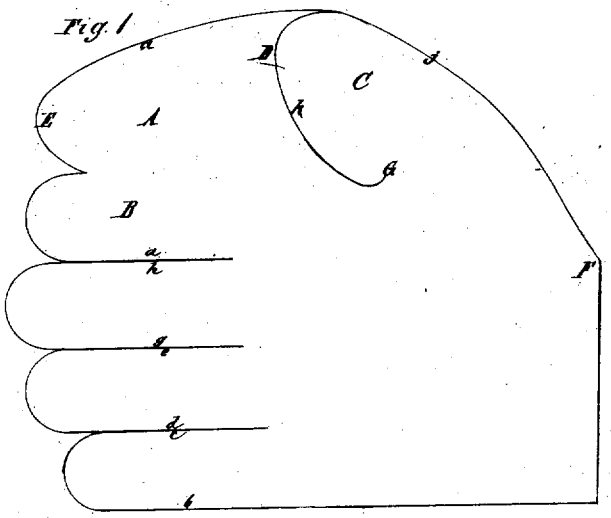
Figure 1 shows a single piece of leather or other material cut to form the front or inside of a glove and the back of the fore-finger.

Fig. 1 shows the inside or palm of a glove, and the inside or face of the thumb-piece C, cut in one piece, the back of the latter being connected with the back of the hand by a seam.

The part A is to be turned over upon the part B to form the fore-finger complete, the edges *a* being joined to form a seam.

Figure 2:
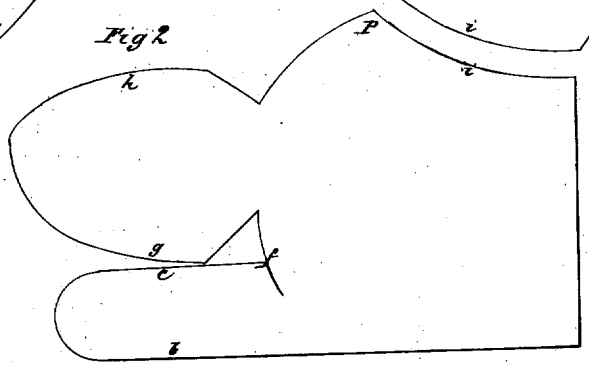
Figure 2 represents, in one piece of stuff, the back of the hand and of the little finger, and backs and sides of the middle finger.

P, fig. 2, is the gore, cut in one with the back piece of the glove, and fitting the space in the side of the glove next to the base of the thumb, thus forming a seam that runs from the point of junction of the first and second fingers, around the back of the first finger, to the base of the thumb.

Figure 3:
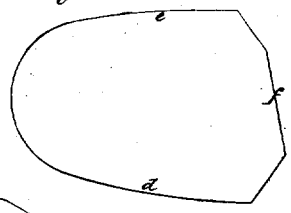
Figure 3 shows the back and sides of the third finger.

The back of the third finger, as per fig. 3, is so shaped as to fit into the back of the glove, at *f*, between the second and fourth fingers, being united thereunto without the interposition of small gore-pieces.

The letters *b*, *c*, *g*, and *h* indicate the remaining seams, that connect the different parts and complete the glove.

Figs. 5 and 6 represent the front and back of a one-fingered mitten, the part H to be turned over upon the part I to form the finger complete, the part L forming the front and sides of the thumb, as in the glove, the back of the thumb being connected with the back of the hand by a seam.

The gore P, fig. 6, fits the space next to the base of the thumb, fig. 5, in the same manner as the gore P in fig. 2.

I do not limit myself to any species of material, but reserve the right to use cloth, kid, oil-dress, or any other suitable stuff.

Having thus described my invention,

What I claim as new, and desire to secure by Letters Patent, is—

1. In a glove or mitten, the palm portion or inside of the hand and the thumb, formed from a single or continuous piece, so united to the back portion that no seam shall be presented between the thumb and palm portion on the inside, substantially as described and shown.

2. The said continuous palm or inside piece, when extended to form the whole of the fore-finger, substantially as described.

3. The back piece, fig. 2, formed with a projecting gore-shaped piece, which fits into and forms the junction between the base of the fore-finger and thumb, substantially as and for the purpose specified.

Figure 4:
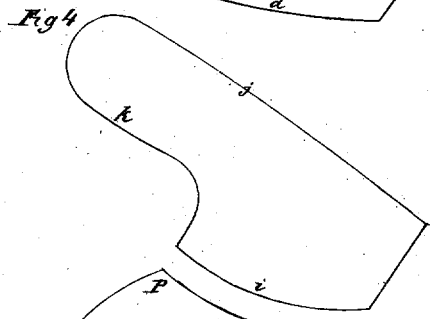
Figure 4 is the back of the thumb.

4. As an article of manufacture, a glove formed of the palm piece, fig. 1, back, fig. 2, finger piece, fig. 3, and thumb piece, fig. 4, the several parts being shaped and united as shown and described, whether the wrist portion be extended to form a gauntlet or not.

R. D. BURR.

Witnesses:
THOS. D. D. OURAND,
CHAS. A. PETTIT.